US009148597B2

United States Patent
Ito

(10) Patent No.: US 9,148,597 B2
(45) Date of Patent: Sep. 29, 2015

(54) ELECTRON MULTIPLICATION FACTOR MEASUREMENT METHOD AND IMAGE CAPTURE DEVICE

(75) Inventor: Katsuhide Ito, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 329 days.

(21) Appl. No.: 13/696,889

(22) PCT Filed: Mar. 7, 2011

(86) PCT No.: PCT/JP2011/055253
§ 371 (c)(1),
(2), (4) Date: Nov. 8, 2012

(87) PCT Pub. No.: WO2011/142167
PCT Pub. Date: Nov. 17, 2011

(65) Prior Publication Data
US 2013/0050475 A1    Feb. 28, 2013

(30) Foreign Application Priority Data
May 14, 2010   (JP) .................................. 2010-112204

(51) Int. Cl.
G01R 19/00   (2006.01)
H04N 5/372   (2011.01)
H04N 5/361   (2011.01)
H04N 5/3725  (2011.01)

(52) U.S. Cl.
CPC ........... *H04N 5/37213* (2013.01); *H04N 5/361* (2013.01); *H04N 5/3725* (2013.01)

(58) Field of Classification Search
CPC .................................................. G01R 19/0061
See application file for complete search history.

(56) References Cited

FOREIGN PATENT DOCUMENTS

| EP | 1688960 | 8/2006 |
|---|---|---|
| EP | 1983739 | 10/2008 |
| JP | 2003-9000 | 1/2003 |
| JP | 2003-158679 | 5/2003 |

(Continued)

OTHER PUBLICATIONS

Robbins, Mark "The Noise Performance of Electron Multiplying Charge Coupled Devices", IEEE Transactions on Electronic Devices, vol. 50, No. 5, May 2003. pp. 1227-1232.*

(Continued)

*Primary Examiner* — Sath V Perungavoor
*Assistant Examiner* — Jeffery Williams
(74) *Attorney, Agent, or Firm* — Drinker Biddle & Reath LLP

(57) ABSTRACT

An image acquisition section 24*a* acquires a multiplied image at a predetermined electron multiplication factor set in advance, and a luminance calculation section 24*b* calculates a luminance average value and a luminance variance average value corresponding to the image section 101*a* in the multiplied image acquired by the luminance calculation section 24*b*, and calculates a luminance average value and a luminance variance average value of pixels corresponding to the OPB section 101*b* in the multiplied image. Then, by using the calculated luminance average value and luminance variance average value, a conversion factor calculation section 24*c* calculates a conversion factor of the multiplied image, and by using this conversion factor and a conversion factor at a reference electron multiplication factor, a multiplication factor calculation section 24*d* calculates an electron multiplication factor of the multiplied image.

10 Claims, 8 Drawing Sheets

(56) References Cited

FOREIGN PATENT DOCUMENTS

| | | |
|---|---|---|
| JP | 2006-324614 | 11/2006 |
| JP | 2008-271049 | 11/2008 |

OTHER PUBLICATIONS

Hynecek, Jaroslav, Impactron a New Solid State Image Intensifier, IEEE Transactions on Electronic Devices, vol. 48, No. 10, Oct. 2001. pp. 2238-2241.*

Robbins M. S. et al., "The Noise Performance of Electron Multiplying Charge-Coupled Devices", IEEE Transactions on Electron Devices, IEEE Service Center, Piscataway, NJ, US, vol. 50, No. 5, May 1, 2003, p. 1227-p. 1232, XP011072658.

Jaroslav Hynecek, "Impactron—A New Solid State Image Intensifier", IEEE Transactions on Electron Devices, IEEE Service Center, Piscataway, NJ, US, vol. 48, No. 10, Oct. 1, 2001, p. 2238, XP011017812.

M. Deweert, et al., "Photon Transfer Methods and Results for Electron Multiplication CCDs", Proceedings of SPIE, vol. 5558 pp. 248-259, 2004.

\* cited by examiner

Fig.6
(a)
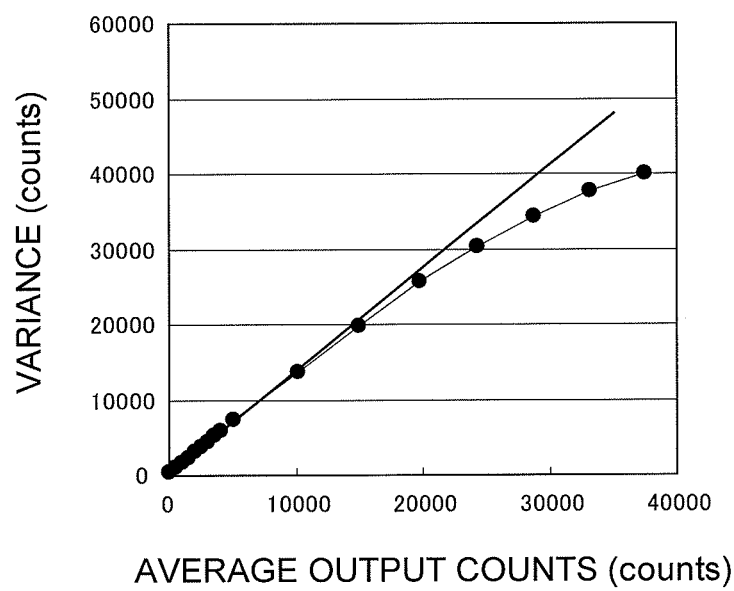
(b)
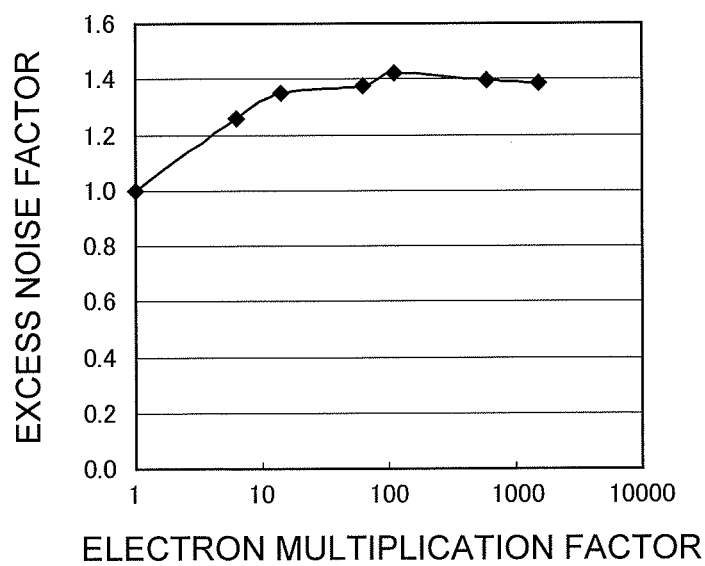

*Fig.7*

| ELECTRON MULTIPLICATION FACTOR | EXCESS NOISE FACTOR |
|---|---|
| 1 OR LESS | 1.0 |
| 1 TO 3 OR LESS | 1.1 |
| 3 TO 5 OR LESS | 1.2 |
| 5 TO 10 OR LESS | 1.3 |
| 10 OR MORE | 1.4 |

US 9,148,597 B2

ELECTRON MULTIPLICATION FACTOR MEASUREMENT METHOD AND IMAGE CAPTURE DEVICE

TECHNICAL FIELD

The present invention relates to an electron multiplication factor measurement method and an imaging device.

BACKGROUND ART

As a conventional imaging device, one with a CMD (Charge Multiplying Detector)-CCD image pickup device including a charge multiplying means is known. In such an imaging device, due to deterioration, etc., of this device, a difference may occur between a multiplication factor that a user sets and an actual multiplication factor in an imaged multiplied image. Therefore, a method is known in which in such an imaging device, a first signal value imaged with pixels corresponding to a shading region of the CMD-CCD image pickup device and multiplied by a multiplication factor of 1 is stored, and further, a second signal value imaged with pixels corresponding to the shading region and multiplied by a predetermined multiplication factor is stored, and by dividing the second signal value by the first signal value, an actual multiplication factor is calculated (for example, refer to Patent Document 1).

CITATION LIST

Patent Literature

Patent Document 1: Japanese Patent Application Laid-Open No. 2003-9000

SUMMARY OF INVENTION

Technical Problem

In the above-described imaging device, a multiplication factor measurement method by which a multiplication factor can be measured in real time has been demanded.

Therefore, an object of the present invention is to provide an electron multiplication factor measurement method and an imaging device by which an electron multiplication factor can be measured in real time.

Solution to Problem

In order to achieve the above-described object, an electron multiplication factor measurement method according to the present invention is an electron multiplication factor measurement method in an imaging device including an electron multiplying image pickup device having a light receiving section and an optical black section, and includes a first step of acquiring a multiplied image at a predetermined electron multiplication factor set in advance, a second step of calculating a luminance average value and a luminance variance average value of pixels corresponding to the light receiving section in the multiplied image, a third step of calculating a luminance average value and a luminance variance average value of pixels corresponding to the optical black section in the multiplied image, a fourth step of calculating a conversion factor of the multiplied image by using the luminance average values and the luminance variance average values calculated in the second and third steps, and a fifth step of obtaining an electron multiplication factor of the multiplied image by using the conversion factor calculated in the fourth step and a conversion factor at a reference electron multiplication factor.

In order to achieve the above-described object, an imaging device according to the present invention is an imaging device with an electron multiplying image pickup device having a light receiving section and an optical black section, and includes an image acquisition section that acquires a multiplied image at a predetermined electron multiplication factor set in advance, a luminance calculation section that calculates a luminance average value and a luminance variance average value of pixels corresponding to the light receiving section and calculates a luminance average value and a luminance variance average value of pixels corresponding to the optical black section in the multiplied image, a conversion factor calculation section that calculates a conversion factor of the multiplied image by using the luminance average values and the luminance variance average values calculated by the luminance calculation section, and a multiplication factor calculation section that obtains an electron multiplication factor of the multiplied image by using the conversion factor calculated by the conversion factor calculation section and a conversion factor at a reference electron multiplication factor.

In these electron multiplication factor measurement method and imaging device, a multiplied image is acquired at a predetermined electron multiplication factor, and in the acquired multiplied image, luminance average values and luminance variance average values of pixels corresponding to the light receiving section and the optical black section are calculated, and a conversion factor in the multiplied image is calculated by using the calculated luminance average values and luminance variance average values. Then, by using the calculated conversion factor and a conversion factor at a reference multiplication factor, an electron multiplication factor of the multiplied image is obtained. Thus, according to the electron multiplication factor measurement method and imaging device, an electron multiplication factor of a multiplied image is obtained by using pixels at the same multiplication factor corresponding to the light receiving section and the optical black section, so that the electron multiplication factor can be measured in real time.

Preferably, the electron multiplication factor measurement method according to the present invention further includes a step of adjusting an electron multiplication voltage so that the electron multiplication factor obtained in the fifth step becomes the predetermined electron multiplication factor set in advance. According to this electron multiplication factor measurement method, as described above, an electron multiplication factor can be measured in real time. Therefore, by adjusting the electron multiplication voltage so that the obtained electron multiplication factor becomes the predetermined electron multiplication factor set in advance, the electron multiplication factor can be adjusted in real time.

Preferably, the electron multiplication factor measurement method according to the present invention further includes a step of correcting a luminance value of the multiplied image so that the electron multiplication factor obtained in the fifth step becomes the predetermined electron multiplication factor set in advance. By the electron multiplication factor measurement method according to the present invention, as described above, an electron multiplication factor can be measured in real time. Therefore, by correcting the luminance value of the multiplied image so that the obtained electron multiplication factor becomes the predetermined electron multiplication factor set in advance, the electron multiplication factor can be adjusted in real time.

Preferably, the electron multiplication factor measurement method according to the present invention further includes a step of correcting the electron multiplication factor obtained in the fifth step by using an excess noise factor corresponding to the electron multiplication factor. In this case, the obtained electron multiplication factor is corrected by using an excess noise factor corresponding to this electron multiplication factor, so that an accurate electron multiplication factor can be obtained.

Further, preferably, in the electron multiplication factor measurement method according to the present invention, in the first step, first and second multiplied images imaged at times different from each other are acquired as the multiplied image, in the second step, based on an added image of the first multiplied image and the second multiplied image, a luminance average value of pixels corresponding to the light receiving section in the multiplied image is calculated, and based on a subtracted image of the first multiplied image and the second multiplied image, a luminance variance average value of the pixels corresponding to the light receiving section in the multiplied image is calculated, and in the third step, based on an added image of the first multiplied image and the second multiplied image, a luminance average value of pixels corresponding to the optical black section in the multiplied image is calculated, and based on a subtracted image of the first multiplied image and the second multiplied image, a luminance variance average value of the pixels corresponding to the optical black section in the multiplied image is calculated. In this case, the multiplied image includes two multiplied images (first and second multiplied images) imaged at different times. In this electron multiplication factor measurement method, luminance average values and luminance variance average values of pixels corresponding to the light receiving section and the optical black section in the multiplied image are calculated based on two multiplied images. Therefore, accurate luminance average values and luminance variance average values are obtained. In particular, the luminance variance average value is calculated based on a subtracted image of two multiplied images, so that influences of shading of the imaging device are reduced and the calculated luminance variance average value becomes accurate.

Advantageous Effects of Invention

The present invention provides an electron multiplication factor measurement method and an imaging device by which an electron multiplication factor can be measured in real time.

BRIEF DESCRIPTION OF DRAWINGS

FIG. 6(a) is a graph showing an example of a relationship between the luminance average value and the luminance variance average value, and FIG. 6(b) is a graph showing an example of a relationship between the electron multiplication factor and the excess noise factor.

FIG. 7 is an example of a table associating the electron multiplication factor with the excess noise factor.

DESCRIPTION OF EMBODIMENTS

Figure 1:
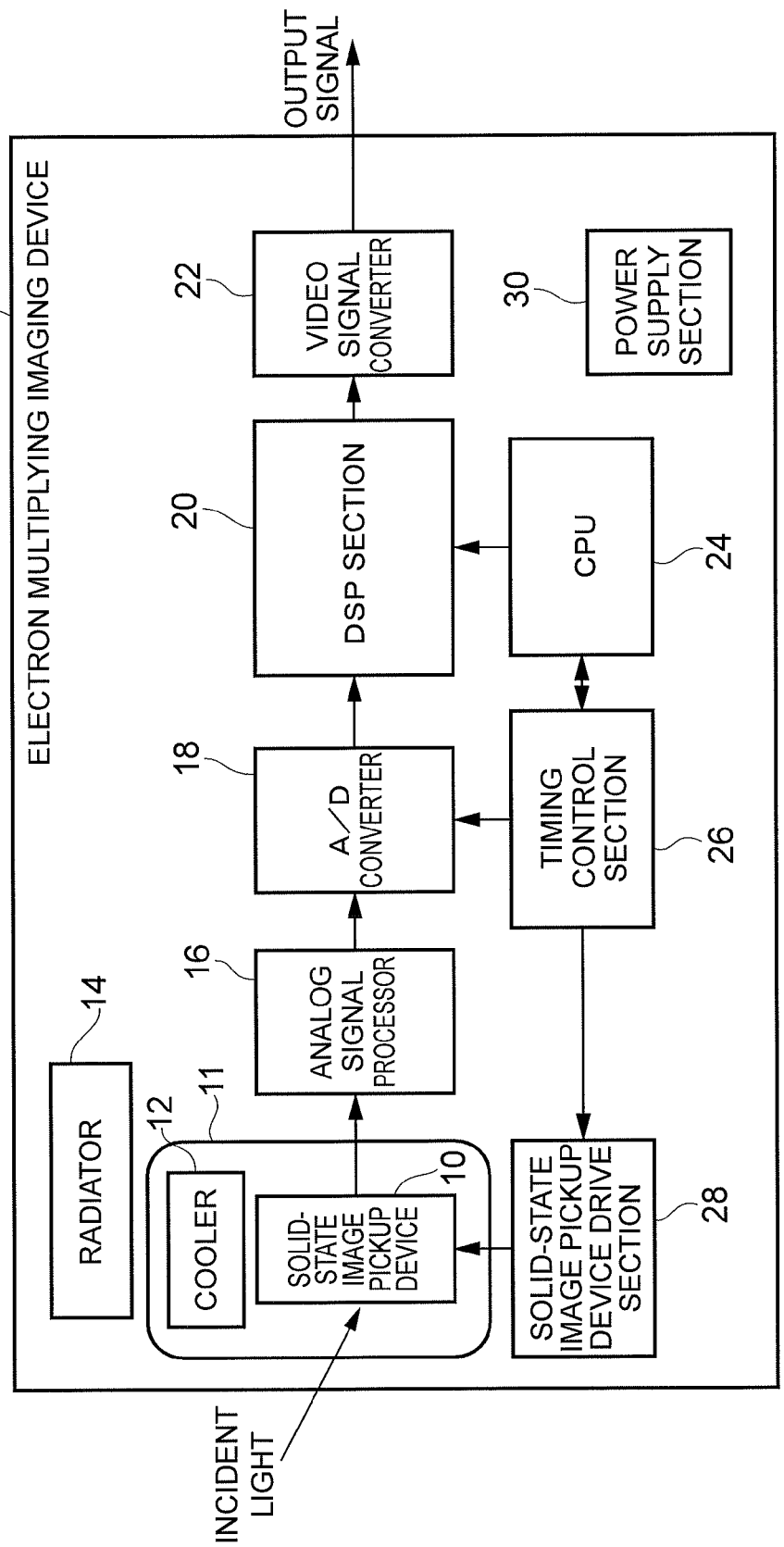
FIG. 1 is a block diagram showing a configuration of an electron multiplying imaging device according to the present embodiment.

Hereinafter, a preferred embodiment of the present invention is described in detail with reference to the drawings. In the drawings, portions identical or equivalent to each other are provided with the same reference symbol, and overlapping description is omitted.

As shown in FIG. 1, the electron multiplying imaging device 1 includes an electron multiplying solid-state image pickup device (electron multiplying image pickup device) 10. This solid-state image pickup device 10 includes a plurality of pixels arrayed to output charge signals generated according to light incident amounts in the pixels, and an electron multiplication section that multiplies the charge signals.

Figure 2:
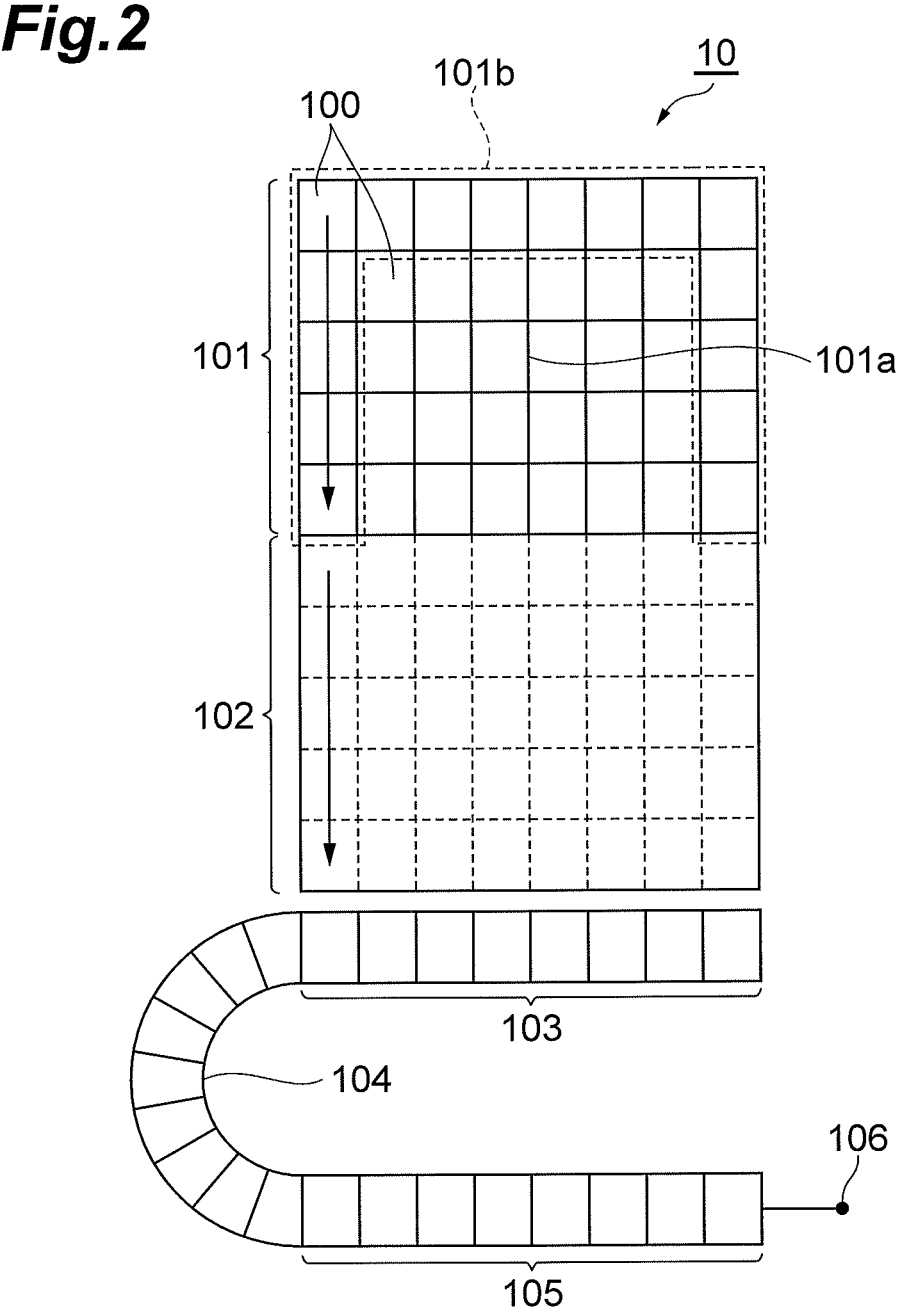
FIG. 2 is a schematic view showing an example of a configuration of the solid-state image pickup device shown in FIG. 1.

As shown in FIG. 2, the solid-state image pickup device 10 is configured as an FT (frame transfer) type CCD that includes an imaging section 101 and an accumulation section 102 consisting of vertical shift registers and a horizontal shift register 103. The imaging section 101 includes an image section (light receiving section) 101a to be used for acquiring an image corresponding to an incident light image, and an optical black (OPB) section 101b that is shaded by a predetermined shading member and used as a reference of a luminance of a portion on which no light is made incident. In the present embodiment, the image section 101a is disposed at the center of the imaging section 101, and the OPB section 101b is disposed along the edge of the image section 101a. This imaging section 101 has a structure in which unit pixels 100 are two-dimensionally arrayed.

The accumulation section 102 has a structure in which unit pixels are two-dimensionally arrayed as in the imaging section 101. The accumulation section 102 is provided between the imaging section 101 and the horizontal shift register 103. This accumulation section 102 is masked with opaque metal, etc., and is not used to detect light images, but is used to accumulate charge signals generated in the unit pixels 100 of the imaging section 101 and transfer the charge signals to the horizontal shift register 103.

In the solid-state image pickup device 10 thus configured, first, when a light image is made incident on the imaging section 101, the image is acquired by generating charge signals corresponding to the incident light in the respective pixels 100. Next, the charge signals generated in the pixels 100 of the imaging section 101 are accumulated in the accumulation section 102. Subsequently, the charge signals are read out by the horizontal shift register 103 being an output register.

The solid-state image pickup device 10 is provided with a multiplication register 105 being an electron multiplication section having an electron multiplication function in addition to the horizontal shift register 103. Accordingly, this solid-state image pickup device 10 is configured as an electron multiplying CCD (EM-CCD) capable of multiplying charge signals by a predetermined electron multiplication factor by transferring the charge signals while applying a voltage as an electron multiplication voltage higher than normal to the multiplication register 105. With this configuration, charge signals transferred from the pixels 100 of the imaging section 101 to the horizontal shift register 103 are further transferred to the multiplication register 105 via a connecting register 104, and accordingly, the charge signals are multiplied by the predetermined electron multiplication factor, and the obtained multiplied charge signals are output as image data from an output terminal 106.

Here, as shown in FIG. 1, the electron multiplying imaging device 1 further includes a cooler 12 and a radiator 14. The cooler 12 keeps the solid-state image pickup device 10 in a state cooled to a predetermined temperature so as to reduce dark current noise, etc. The radiator 14 is connected to the heat release side of the cooler 12, and performs radiation by convection caused by using a fan or water circulation. The cooler 12 and the solid-state image pickup device 10 are sealed inside a vacuum sealed tube 11.

The electron multiplying imaging device 1 further includes an analog signal processor 16, an A/D converter 18, a DSP (digital signal processor) section 20, and a video signal converter 22. The analog signal processor 16 applies necessary signal processing to analog charge signals output from the solid-state image pickup device 10. Signal processing to be performed by the analog signal processor 16 is, for example, direct current restoration of analog video signals (charge signals) output from the solid-state image pickup device 10 and amplification of the analog video signals for obtaining amplitude suitable for subsequent A/D conversion.

The A/D converter 18 converts analog video signals output from the analog signal processor 16 into digital video signals and outputs these to the subsequent DSP section 20. The DSP section 20 applies signal processing to the digital video signals output from the A/D converter 18 and outputs these to the subsequent video signal converter 22. The video signal converter 22 adds horizontal and vertical video synchronization signals to the digital video signals being image data output from the DSP section 20 to generate digital video signals as output signals to be output to the outside from the electron multiplying imaging device 1.

The electron multiplying imaging device 1 further includes a CPU 24, a timing control section 26, and a solid-state image pickup device drive section 28. The CPU 24 is a CPU for executing imaging control processing, and controls operations of the respective components such as the DSP section 20, the timing control section 26, and the solid-state image pickup device drive section 28 of the electron multiplying imaging device 1.

Figure 3:
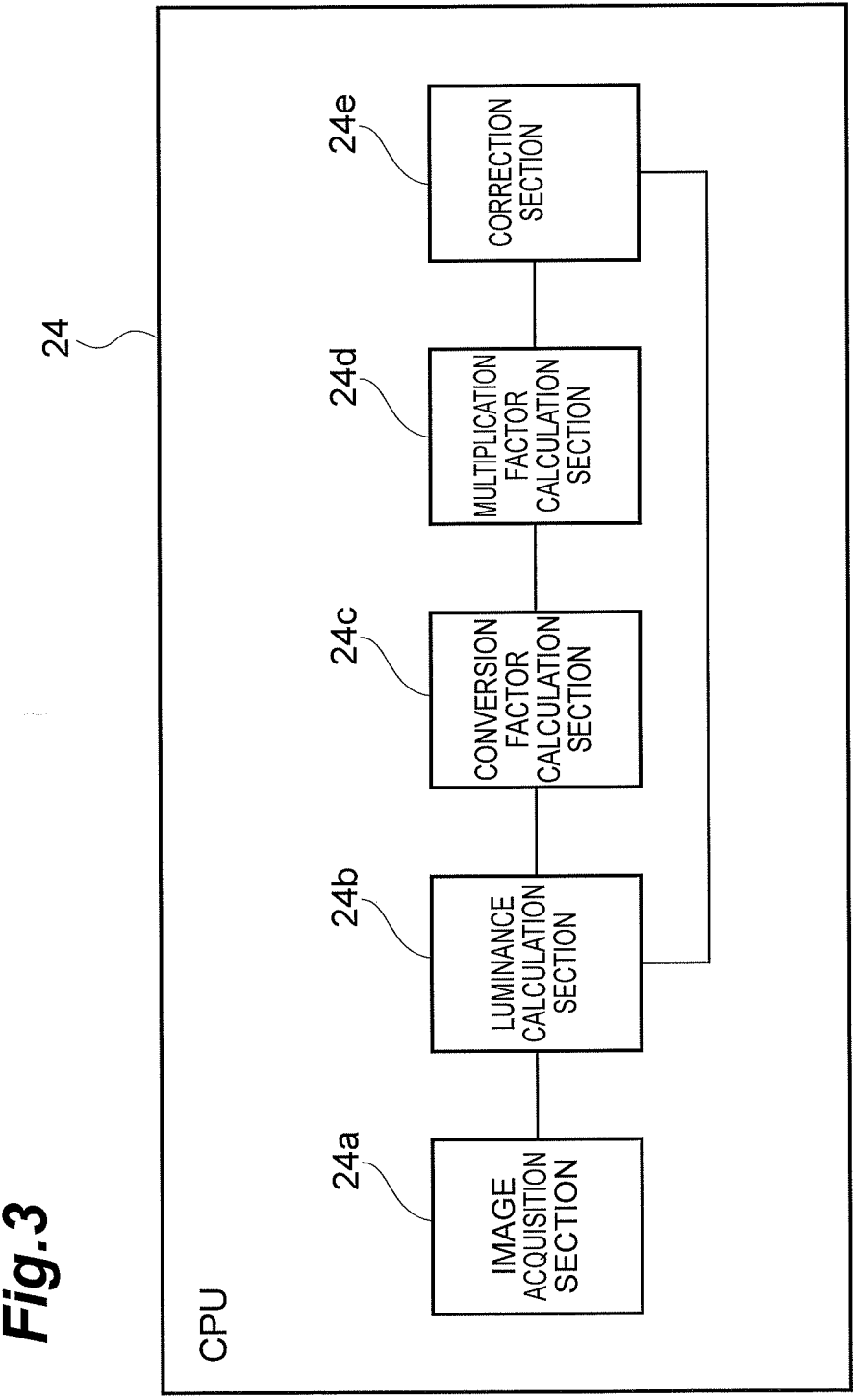
FIG. 3 is a block diagram showing a functional configuration of the CPU shown in FIG. 1.

The CPU 24 functionally includes, as shown in FIG. 3, an image acquisition section 24a, a luminance calculation section 24b, a conversion factor calculation section 24c, a multiplication factor calculation section 24d, and a correction section 24e. The CPU 24 executes processings of the electron multiplication factor measurement method described later by performing predetermined arithmetic operations by the components from the image acquisition section 24a to the correction section 24e.

The timing control section 26 generates and outputs timing signals necessary for operations of the solid-state image pickup device 10 and the A/D converter 18, etc. The solid-state image pickup device drive section 28 performs control of charge transfer in the imaging section 101, the accumulation section 102 and the registers 103 to 105, and control of conditions of the electron multiplication voltage for the multiplication register 105, etc., by referring to timing signals from the timing control section 26 and command signals from the CPU 24, etc. Voltages necessary for operations of the respective components of the electron multiplying imaging device 1 are supplied from a power supply section 30.

Figure 4:
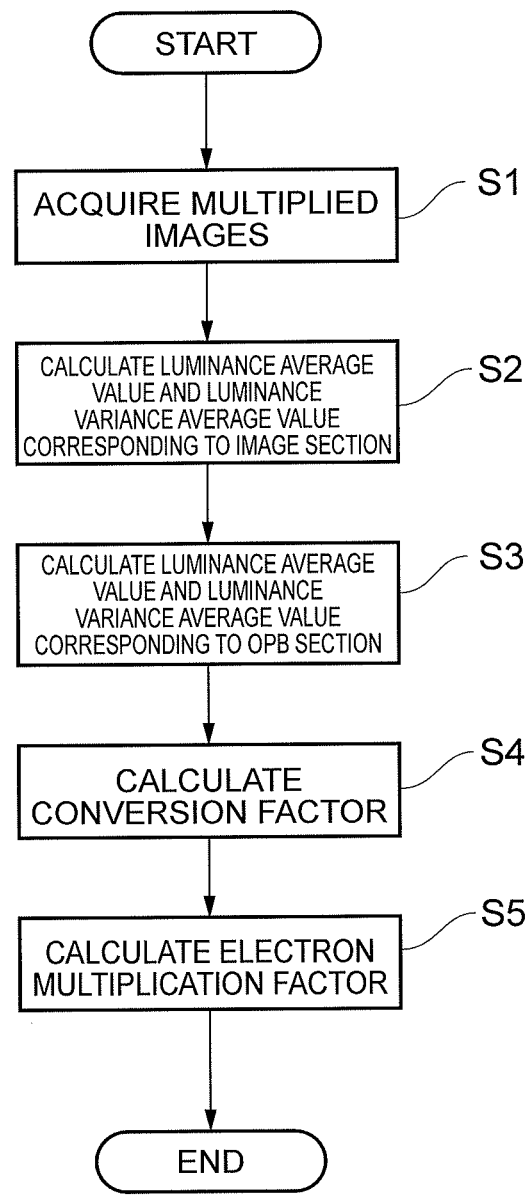
FIG. 4 is a flowchart showing steps of an electron multiplication factor measurement method in the electron multiplying imaging device shown in FIG. 1.

Next, an electron multiplication factor measurement method in the electron multiplying imaging device 1 is described with reference to FIG. 4. This measurement method is performed by properly controlling the respective components of the electron multiplying imaging device 1 by the CPU 24 and carrying out predetermined arithmetic operations by the components from the image acquisition section 24a to the correction section 24e.

First, the image acquisition section 24a acquires a multiplied image at a predetermined electron multiplication factor set in advance (first step S1). In detail, multiplied charge signals generated by the solid-state image pickup device 10 at the predetermined electron multiplication factor set in advance are subjected to signal processing by the analog signal processor 16 and then converted into digital signals by the A/D converter 18, and stored as a multiplied image in a memory of the DSP section 20.

Subsequently, the luminance calculation section 24b calculates a luminance average value (average output counts) and a luminance variance average value (variance of average output counts) of pixels corresponding to the image section 101a in the multiplied image acquired (stored) in the first step S1 (second step S2). Here, pixels corresponding to the image section 101a in the multiplied image are pixels constituting a part of the multiplied image and corresponding to charge signals from the pixels 100 of the image section 101a of the solid-state image pickup device 10.

Subsequently, the luminance calculation section 24b also calculates a luminance average value and a luminance variance average value of pixels corresponding to the OPB section 101b in the multiplied image acquired in the first step S1 (third step S3). Here, the pixels corresponding to the OPB section 101b in the multiplied image are pixels constituting a part of the multiplied image and corresponding to charge signals from the pixels 100 of the OPB section 101b of the solid-state image pickup device 10.

Subsequently, by using the luminance average values and luminance variance average values calculated in the second step S2 and the third step S3, the conversion factor calculation section 24c calculates a conversion factor of the multiplied image acquired in the first step S1 (fourth step S4). Here, the conversion factor is a coefficient showing how many photoelectrons the output count of 1 is equivalent of, and can be obtained as follows.

It is known that the luminance variance average value is expressed as a linear function of the luminance average value as expressed by the following formula.

$$V(I) = (1/CF) \times (I\text{-offset}) + r^2/CF^2 \qquad \text{[Numerical formula 1]}$$

Figure 5:
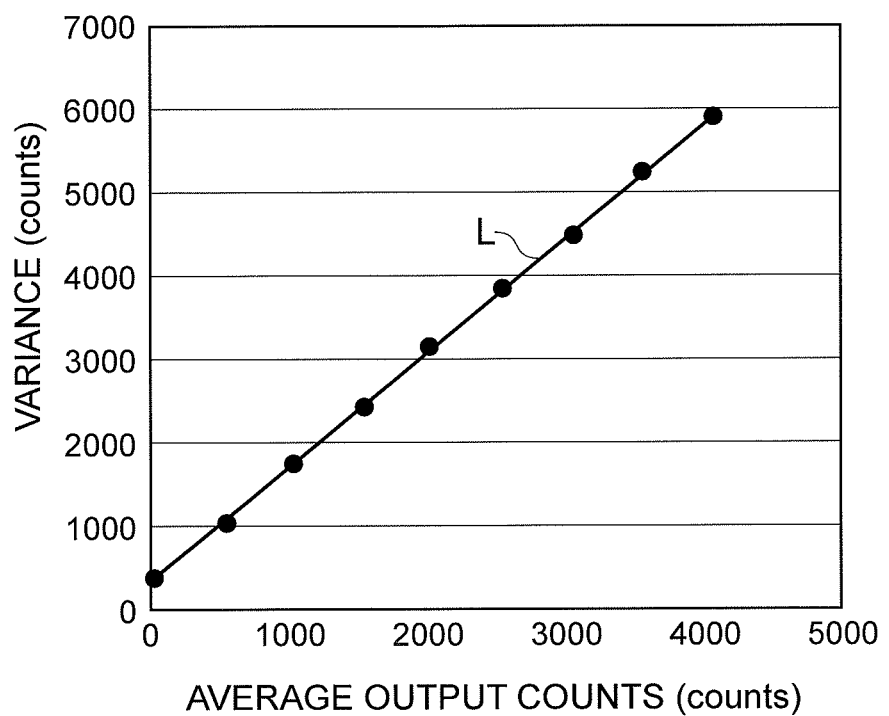
FIG. 5 is a graph showing an example of a relationship between the luminance average value and the luminance variance average value.

Here, V(I) is a luminance variance average value, CF is a conversion factor, I is a luminance average value, and r is a readout noise. According to the above-described formula, the slope of the luminance variance average value V(I) (coefficient of the luminance average value I) is the reciprocal of the conversion factor CF. FIG. 5 is a diagram in which luminance average values and luminance variance average values in a plurality of images are plotted by way of example. In FIG. 5, the straight line L connecting the respective points is substantially the luminance variance average value V(I) of the above-described formula.

Therefore, by obtaining the slope of this straight line L and calculating the reciprocal thereof, a conversion factor is obtained. The slope of the straight line L is obtained from luminance average values and luminance variance average values of two multiplied images (or pixels) with luminances different from each other. Specifically, when the luminance average value and the luminance variance average value of pixels corresponding to the image section 101a are defined as Ia and Va, respectively, and the luminance average value and the luminance variance average value of the pixels corresponding to the OPB section 101b are defined as Ib and Vb, respectively, the conversion factor CF can be obtained by the following formula.

$$CF=(Ia-Ib)/(Va-Vb) \quad \text{[Numerical formula 2]}$$

Subsequently, by using the conversion factor calculated in the fourth step S4 as described above and a conversion factor at a reference electron multiplication factor (for example, 1) held in advance, the multiplication factor calculation section 24d calculates a net electron multiplication factor of the multiplied image acquired in the first step S1 (that is, a net electron multiplication factor of the solid-state image pickup device 10) (fifth step S5). This net electron multiplication factor can be obtained by the following formula according to the knowledge of the inventors.

Net electron multiplication factor=Conversion factor at reference electron multiplication factor/Conversion factor at net electron multiplication factor   [Numerical formula 3]

Herein, the conversion factor at the net electron multiplication factor of the above-described formula is the conversion factor calculated in the fourth step S4. Through the above-described steps, an actual electron multiplication factor of the multiplied image acquired at the predetermined electron multiplication factor set in advance is obtained. The obtained electron multiplication factor may be output as a numerical value in real time or output together with image data.

As described above, in the electron multiplication factor measurement method according to the present embodiment, a multiplied image is acquired at a predetermined electron multiplication factor set in advance, luminance average values and luminance variance average values of pixels corresponding to the image section 101a and the OPB section 101b in the acquired multiplied image are calculated, and by using the calculated luminance average values and the luminance variance average values, a conversion factor in the multiplied image is calculated. Then, by using the calculated conversion factor and a conversion factor at a reference multiplication factor, an electron multiplication factor of the multiplied image is obtained. Thus, by this electron multiplication factor measurement method (that is, by the electron multiplying imaging device 1), an electron multiplication factor of a multiplied image is obtained by using pixels at the same multiplication factor corresponding to the image section 101a and the OPB section 101b, so that the electron multiplication factor can be measured in real time.

It is also possible that two multiplied images with different luminances are acquired at a predetermined electron multiplication factor, and by calculating luminance average values and luminance variance average values of the two multiplied images, a conversion factor is obtained and electron multiplication factor is obtained as described above. In this case, one of the two multiplied images may be a dark image acquired by being shaded with a shutter or a cap, etc. However, the electron multiplication factor measurement method according to the present embodiment is efficient since by using pixels corresponding to the OPB section 101b as a dark image, it becomes unnecessary to acquire a dark image by shading with a shutter or a cap, etc., and by using pixels corresponding to the image section 101a as well, an electron multiplication factor can be obtained based on one multiplied image.

Here, the linearity between the luminance average value and the luminance variance average value deteriorates as the luminance average value increases as shown in FIG. 6(a). Therefore, it is preferable that luminance average values with poor linearity are measured in advance, and a maximum luminance average value is set so as not to obtain an electron multiplication factor at the luminance average values with poor linearity. In this case, an electron multiplication factor is prevented from being obtained at luminance average values with poor linearity exceeding the maximum luminance average value, so that an electron multiplication factor can be accurately obtained.

To obtain a more accurate electron multiplication factor, an excess noise factor must be considered. The excess noise factor shows multiplication fluctuation that occurs when multiplying electrons. It is known that such an excess noise factor changes according to changes in electron multiplication factor (refer to, for example, "Photon Transfer Methods and Results for Electron Multiplication CCDs, Proceedings of SPIE Vol. 5558, pp. 248-259"). An example of a change in excess noise factor according to a change in electron multiplication factor is shown in FIG. 6(b). Referring to FIG. 6(b), the excess noise factor is 1.0 when the electron multiplication factor is 1, and the excess noise factor increases as the electron multiplication factor increases, and becomes substantially 1.4 when the electron multiplication factor is 10 or more.

Therefore, preferably, the electron multiplication factor measurement method according to the present embodiment further includes a step of correcting the electron multiplication factor obtained in the fifth step S5 by the correction section 24e by using the excess noise factor corresponding to the electron multiplication factor as a step subsequent to the fifth step S5. In this case, by dividing the electron multiplication factor obtained in the fifth step S5 by an excess noise factor corresponding to the electron multiplication factor, a corrected electron multiplication factor can be obtained. By performing this correction, an actual electron multiplication factor of the multiplied image acquired in the first step S1 can be accurately obtained. A table associating the electron multiplication factor with the excess noise factor as shown in FIG. 7 is held in advance and the correction is performed by referring to the table, and accordingly, more efficient correction of the electron multiplication factor can be performed.

Figure 8:
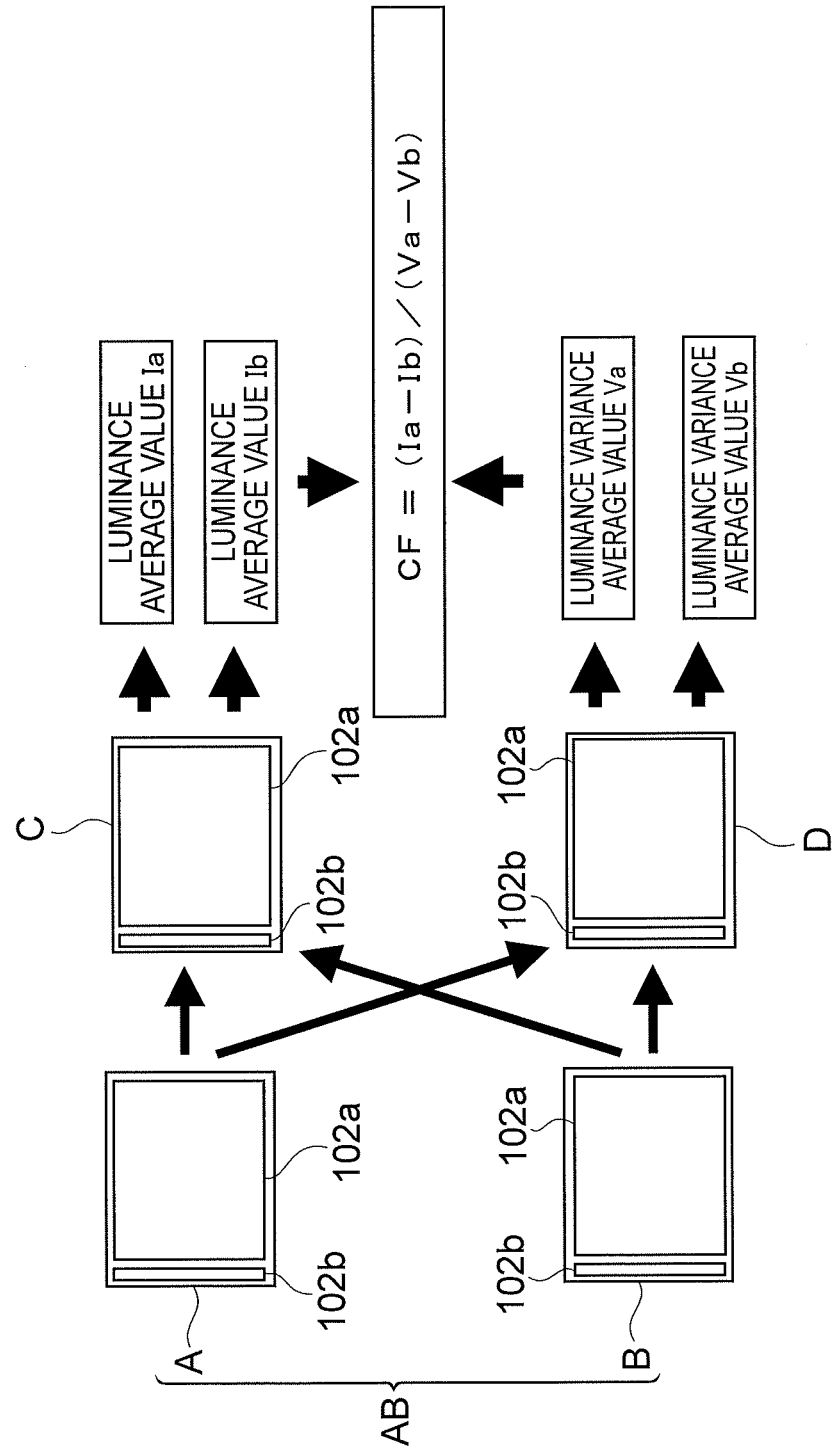
FIG. 8 is a diagram showing a part of other steps of the electron multiplication factor measurement method according to the present embodiment.

In the electron multiplication factor measurement method according to the present embodiment, in the first step S1, as shown in FIG. 8, the image acquisition section 24a can acquire a first multiplied image (for example, an image one-frame before) A and a second multiplied image (for example, a current image) B imaged at times different from each other (if possible, successive times) as a multiplied image AB. At this time, the image acquisition section 24a generates an added image C of the first multiplied image A and the second multiplied image B and stores the added image C in the memory of the DSP section 20, and generates a subtracted image D of the first multiplied image A and the second multiplied image B and stores the subtracted image D in the memory of the DSP section 20. The first multiplied image A and the second multiplied image B are imaged at the same electron multiplication factor with the same light amount. Each of the first multiplied image A, the second multiplied image B, the added image C and the subtracted image D includes a region 102a of pixels corresponding to the image section 101a and a region 102b of pixels corresponding to the OPB section 101b.

In this case, the second step S2 and subsequent steps are as follows. First, in the second step S2, the luminance calculation section 24b calculates a luminance average value of pixels (that is, the region 102a) corresponding to the image section 101a of the multiplied image AB based on the added image C, and calculates a luminance variance average value of the pixels corresponding to the image section 101a of the multiplied image AB based on the subtracted image D. In detail, the luminance calculation section 24b calculates a luminance average value of pixels corresponding to the image section 101a of the added image C, and uses a value obtained by dividing the calculated luminance average value by 2 as a luminance average value Ia of the pixels corresponding to the image section 101a of the multiplied image AB. In addition, the luminance calculation section 24b calculates a luminance variance average value of the pixels corresponding to the image section 101a of the subtracted image D, and uses a value obtained by dividing the calculated luminance variance average value by 2 as a luminance variance average value Va of the pixels corresponding to the image section 101a of the multiplied image AB.

Subsequently, in the third step S3, the luminance calculation section 24b calculates a luminance average value of pixels (that is, region 102b) corresponding to the OPB section 101b of the multiplied image AB based on the added image C, and a luminance variance average value of the pixels corresponding to the OPB section 101b of the multiplied image AB based on the subtracted image D. In detail, the luminance calculation section 24b calculates a luminance average value of the pixels corresponding to the OPB section 101b of the added image C, and uses a value obtained by dividing the calculated luminance average value by 2 as a luminance average value Ib of the pixels corresponding to the OPB section 101b of the multiplied image AB. In addition, the luminance calculation section 24b calculates a luminance variance average value of the pixels corresponding to the OPB section 101b of the subtracted image D, and uses a value obtained by dividing the calculated luminance variance average value by 2 as a luminance variance average value Vb of the pixels corresponding to the OPB section 101b of the multiplied image AB.

Then, the conversion factor calculation section 24c calculates a conversion factor CF by using the luminance average values Ia and Ib and the luminance variance average values Va and Vb calculated as described above (fourth step S4), and the multiplication factor calculation section 24d calculates a net electron multiplication factor of the multiplied image AB (fifth step S5).

Thus, two multiplied images of the first multiplied image A and the second multiplied image B are acquired in the first step S1, and by using the added image and the subtracted image of these multiplied images in the second step S2 and third step S3, accurate luminance average value and luminance variance average value of the multiplied image AB can be obtained. In particular, the luminance variance average value is calculated based on a subtracted image of two images, so that influences of shading of the subject, lens, electron multiplying imaging device 1, etc., are eliminated, and the calculated luminance variance average value becomes accurate. Even if the amount of light to be made incident on the image section 101a is not uniform, an accurate electron multiplication factor can be obtained.

Further, the electron multiplication factor measurement method according to the present embodiment may include, as a step subsequent to the fifth step, a step of adjusting an electron multiplication voltage by the correction section 24e so that the electron multiplication factor obtained in the fifth step S5 becomes the predetermined electron multiplication factor set in advance when the electron multiplication factor obtained in the fifth step S5 is different from the predetermined electron multiplication factor set in advance (that is, when the actual electron multiplication factor and the set electron multiplication factor are different from each other).

Alternatively, the electron multiplication factor measurement method according to the present embodiment may include, as a step subsequent to the fifth step, a step of correcting the luminance value of the multiplied image by the correction section 24e so that the electron multiplication factor obtained in the fifth step S5 becomes the predetermined electron multiplication factor set in advance when the electron multiplication factor obtained in the fifth step S5 is different from the predetermined electron multiplication factor set in advance.

When the method includes these steps, an electron multiplication factor can be measured in real time through the first step S1 to the fifth step S5 described above, so that the electron multiplication factor can be adjusted in real time.

Storage of the images in the embodiment described above is not limited to storage in the memory of the DSP section 20 but may be storage in an external storage device such as an HDD connected to the electron multiplying imaging device 1.

INDUSTRIAL APPLICABILITY

The present invention provides an electron multiplication factor measurement method and an imaging device by which an electron multiplication factor can be measured in real time.

REFERENCE SIGNS LIST

1 . . . Electron multiplying imaging device, 10 . . . Solid-state image pickup device, 24a . . . Image acquisition section, 24b . . . Luminance calculation section, 24c . . . Conversion factor calculation section, 24d . . . Multiplication factor calculation section, 101a . . . Image section, 101b . . . OPB section

The invention claimed is:

1. A method for measuring an electron multiplication factor in an imaging device including an electron multiplying image pickup device having a light receiving section and an optical black section, the method comprising:
   acquiring a multiplied image at a predetermined electron multiplication factor set in advance using the light receiving section and the optical black section;
   calculating a first luminance average value and a first luminance variance average value of pixels corresponding to the light receiving section in the multiplied image;
   calculating a second luminance average value and a second luminance variance average value of pixels corresponding to the optical black section in the multiplied image;
   calculating a conversion factor of the multiplied image based on the first luminance average value, the first luminance variance average value, the second luminance average value and the second luminance variance average value; and
   obtaining the electron multiplication factor of the multiplied image based on a ratio between a conversion factor at a reference electron multiplication factor and the calculated conversion factor.

2. The method according to claim 1, further comprising: adjusting an electron multiplication voltage so that the obtained electron multiplication factor approaches the predetermined electron multiplication factor set in advance.

3. The method according to claim 1, further comprising: correcting a luminance value of the multiplied image so that the obtained electron multiplication factor approaches the predetermined electron multiplication factor set in advance.

4. The method according to claim 1, wherein the obtaining step comprises correcting the obtained electron multiplication factor based on an excess noise factor corresponding to the obtained electron multiplication factor.

5. The method according to claim 1, wherein,
the acquiring step comprises acquiring a first multiplied image and a second multiplied image imaged at times different from each other using the light receiving section and the optical black section,
the calculating a first luminance average value and a first luminance variance average value step comprises calculating the first luminance average value based on an image obtained by adding the first multiplied image and the second multiplied image, and calculating the first luminance variance average value based on an image obtained by subtracting the first multiplied image and the second multiplied image, and
the calculating a second luminance average value and a second luminance variance average value step comprises calculating the second luminance average value based on an image obtained by adding the first multiplied image and the second multiplied image, and calculating the second luminance variance average value based on an image obtained by subtracting the first multiplied image and the second multiplied image.

6. A device for acquiring a multiplied image, the device comprising:
an image acquisition section comprising a light receiving section and an optical black section and configured to acquire a multiplied image at a predetermined electron multiplication factor set in advance;
a luminance calculation section configured to calculate a first luminance average value and a first luminance variance average value of pixels corresponding to the light receiving section in the multiplied image, and calculate a second luminance average value and a second luminance variance average value of pixels corresponding to the optical black section in the multiplied image;
a conversion factor calculation section configured to calculate a conversion factor of the multiplied image based on the first luminance average value, the first luminance variance average value, the second luminance average value and the second luminance variance average value; and
a multiplication factor calculation section configured to obtain an electron multiplication factor of the multiplied image based on a ratio between a conversion factor at a reference electron multiplication factor and the calculated conversion factor.

7. The device according to claim 6, further comprising:
an adjusting section configured to adjust an electron multiplication voltage so that the obtained electron multiplication factor approaches the predetermined electron multiplication factor set in advance.

8. The device according to claim 6, further comprising:
a correcting section configured to correct a luminance value of the multiplied image so that the obtained electron multiplication factor approaches the predetermined electron multiplication factor set in advance.

9. The device according to claim 6, wherein
the multiplication factor calculation section corrects the obtained electron multiplication factor based on an excess noise factor corresponding to the obtained electron multiplication factor.

10. The device according to claim 6, wherein,
the image acquisition section acquires a first multiplied image and a second multiplied image imaged at times different from each other,
the luminance calculation section calculates the first luminance average value and the second luminance average value based on an image added the first multiplied image and the second multiplied image, and calculates the first luminance variance average value and the second luminance variance average value based on an image subtracted the first multiplied image and the second multiplied image.

* * * * *